US010093225B2

(12) United States Patent
Salter et al.

(10) Patent No.: US 10,093,225 B2
(45) Date of Patent: Oct. 9, 2018

(54) COURTESY LIGHTING SYSTEM AND METHOD FOR A DOOR OF A MOTOR VEHICLE

(71) Applicant: FORD GLOBAL TECHNOLOGIES, LLC, Dearborn, MI (US)

(72) Inventors: Stuart C. Salter, White Lake, MI (US); Aaron Bradley Johnson, Allen Park, MI (US); Bhavani Thota, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/156,913

(22) Filed: May 17, 2016

(65) Prior Publication Data

US 2017/0334351 A1    Nov. 23, 2017

(51) Int. Cl.
| | |
|---|---|
| *B60Q 9/00* | (2006.01) |
| *B60Q 3/217* | (2017.01) |
| *B60Q 1/00* | (2006.01) |
| *H04R 1/02* | (2006.01) |

(52) U.S. Cl.
CPC ........... *B60Q 3/217* (2017.02); *B60Q 1/0017* (2013.01); *B60Q 1/0094* (2013.01); *B60Q 9/00* (2013.01); *H04R 1/028* (2013.01); *H04R 2499/13* (2013.01)

(58) Field of Classification Search
CPC ................................................... B60Q 3/0293
See application file for complete search history.

(56) References Cited

U.S. PATENT DOCUMENTS

| | | | | |
|---|---|---|---|---|
| 6,158,869 A * | 12/2000 | Barnes, Jr. | ............. | B60Q 1/323 362/501 |
| 7,299,892 B2 * | 11/2007 | Radu | ................... | B60R 13/0237 181/141 |
| 7,810,969 B2 * | 10/2010 | Blackmore | .......... | B60N 2/4686 362/459 |
| 8,333,492 B2 | 12/2012 | Dingman et al. | | |
| 8,876,343 B2 | 11/2014 | Murray et al. | | |
| 2005/0002199 A1 * | 1/2005 | Stuffle | ................. | B60R 11/0217 362/487 |
| 2011/0241544 A1 * | 10/2011 | Murray | .................. | B60Q 1/323 315/77 |
| 2012/0206050 A1 * | 8/2012 | Spero | ....................... | B60Q 1/04 315/152 |
| 2013/0154792 A1 * | 6/2013 | Reed | ....................... | E05F 15/43 340/3.1 |
| 2015/0103175 A1 * | 4/2015 | Lee | ..................... | B60R 25/1001 348/148 |

* cited by examiner

*Primary Examiner* — Joseph Feild
*Assistant Examiner* — Pameshanand Mahase
(74) *Attorney, Agent, or Firm* — Vichit Chea; King & Schickli, PLLC

(57) ABSTRACT

A courtesy lighting system is provided for a door of a motor vehicle. That courtesy lighting system includes an audio speaker, a light source, a network interface connected to the audio speaker and the light source and a control module. The control module is connected to the network interface. The control module includes a controller configured to operate in (a) an ambient illumination mode, (b) a footwell illumination mode when the door is closed and (c) a puddle illumination mode when the door is opened. A method of lighting a door of a motor vehicle is also provided.

19 Claims, 5 Drawing Sheets

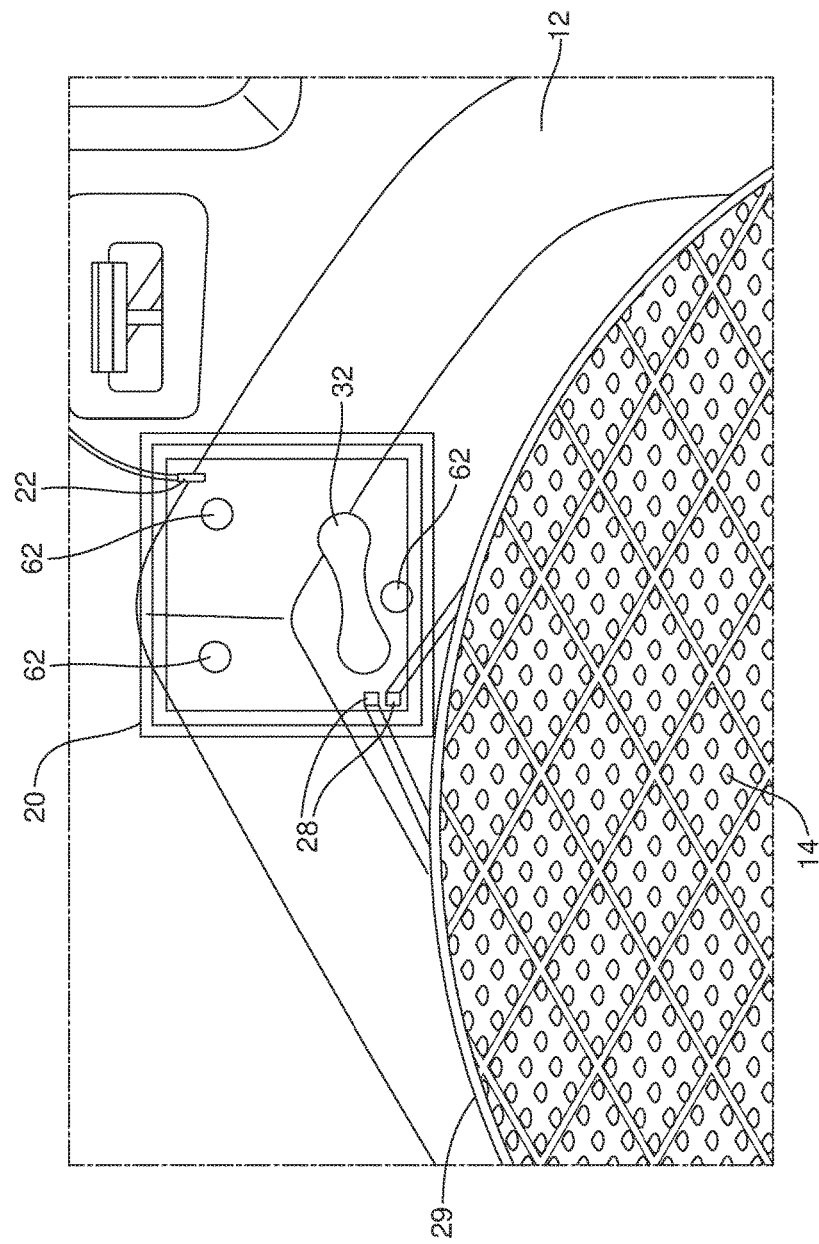

COURTESY LIGHTING SYSTEM AND METHOD FOR A DOOR OF A MOTOR VEHICLE

TECHNICAL FIELD

This document relates generally to the motor vehicle equipment field and, more particularly, to a new and improved courtesy lighting system and related method for a door of a motor vehicle.

BACKGROUND

It is well known in the art to equip motor vehicles with sophisticated ambient and courtesy lighting in order to enhance customer satisfaction. This document relates to a new and improved courtesy lighting system and related method for lighting a door of a motor vehicle that achieves a number of benefits and advantages.

More specifically, the courtesy lighting system incorporates multiple lighting elements that are combined with a speaker and driven by means of a control module through a single network interface. That control module includes a controller configured to operate in (a) an ambient illumination mode, (b) a footwell illumination mode when the door is closed, (c) a puddle illumination mode when the door is open and (d) an open door warning mode when the door is open and the vehicle is moving.

SUMMARY

In accordance with the purposes and benefits described herein, a courtesy lighting system is provided for a door of a motor vehicle. That courtesy lighting system comprises an audio speaker, a light source, a network interface connected to the audio speaker and the light source and a control module. The control module is connected to the network interface. Further the control module includes a controller configured to operate in (a) an ambient illumination mode, (b) a footwell illumination mode when the door is closed and (c) a puddle illumination mode when the door is opened.

The light source emits a first light beam in the footwell illumination mode and a second light beam in the puddle illumination mode wherein the first light beam differs from the second light beam by at least one characteristic selected from a group including light intensity, light beam direction and light beam shape.

Further, the courtesy light system may include a controller configured to operate in a door open warning mode when the door is open and the motor vehicle is moving.

The light source of the courtesy lighting system may include a first lighting element for lighting the audio speaker and providing standard ambient lighting. Further, the light source may include a second lighting element for lighting the footwell when in the footwell lighting mode and the door is closed. Still further, the light source may include a third lighting element for lighting the ground outside the motor vehicle when in the puddle illumination mode and the door is open.

The audio speaker and the three lighting elements of the light source may all be provided on a single printed circuit board. Further, the network interface utilized for that single printed circuit board, the audio speaker and the light source may comprise a local interconnect network (LIN).

The controller of the courtesy lighting system may be configured to flash the first lighting element when operating in a door open warning mode. That first lighting element may operate at a first intensity when providing ambient lighting of the audio speaker and at a second intensity when flashing an open door warning when operating in the open door warning mode. That second intensity may be two times, three times, four times or greater in intensity than the first intensity.

Further, the controller may be configured to operate the second lighting element and third lighting element at reduced intensity when operating the first lighting element in the open door warning mode. This is done in order to conserve the heatsink capacity of the printed circuit board for the first lighting element as it operates at the increased warning intensity.

It should also be appreciated that the first lighting element may be operated in a first color when providing ambient lighting and in a second, different color when providing an open door warning. That second, different color is red in one possible embodiment.

The controller of the courtesy lighting system may also be configured to compensate for ambient lighting conditions. Thus, the light source may be operated at a higher intensity in higher ambient light conditions and at a lower intensity in lower ambient light conditions.

In accordance with an additional aspect, a method is provided of lighting a door of a motor vehicle using multiple lighting elements. That method may be broadly described as comprising the steps of: (a) connecting the multiple lighting elements to a control module by means of a single network interface and (b) configuring a controller of that control module to operate the multiple lighting elements in an ambient illumination mode, a footwell illumination mode, a puddle illumination mode and a door open warning mode.

The method may also include the step of commanding, by the controller, a first lighting element to illuminate an audio speaker in a door of the motor vehicle in a first color light when in the ambient lighting mode. Further, the method may include the step of commanding, by the controller, the first lighting element to illuminate the audio speaker in a second color when in the door open warning mode. Further, the first lighting element may be flashing in the door open warning mode.

Still further, the method may include the step of commanding, by the controller, a second lighting element to light the footwell when in the footwell illuminating mode wherein the door is closed. In addition, the method may include the additional step of commanding, by the controller, a third lighting element to light the ground outside the motor vehicle when in the puddle illuminating mode and the door is open. In addition, the method may include varying, by the controller, lighting characteristics of the first lighting element, the second lighting element and the third lighting element depending upon ambient light conditions or other appropriate factors which are described in greater detail below.

In the following description, there are shown and described several preferred embodiments of the courtesy lighting system and the related method of lighting a door of a motor vehicle. As it should be realized, the system and method are capable of other, different embodiments and its several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the courtesy lighting system and related method of lighting a door of a motor vehicle and together with the description serve to explain certain principles thereof. In the drawing figures:

FIG. 1a is a detailed schematic view of one embodiment of the courtesy lighting system including an audio speaker and a light source, incorporating three lighting elements, all provided on a single printed circuit board (PCB) connected by a single wiring harness and network interface to the control module and power sources of the motor vehicle.

Reference will now be made in detail to the present preferred embodiments of the courtesy lighting system and related method of lighting a motor vehicle door, examples of which are illustrated in the accompanying drawing figures.

DETAILED DESCRIPTION

Figure 1:
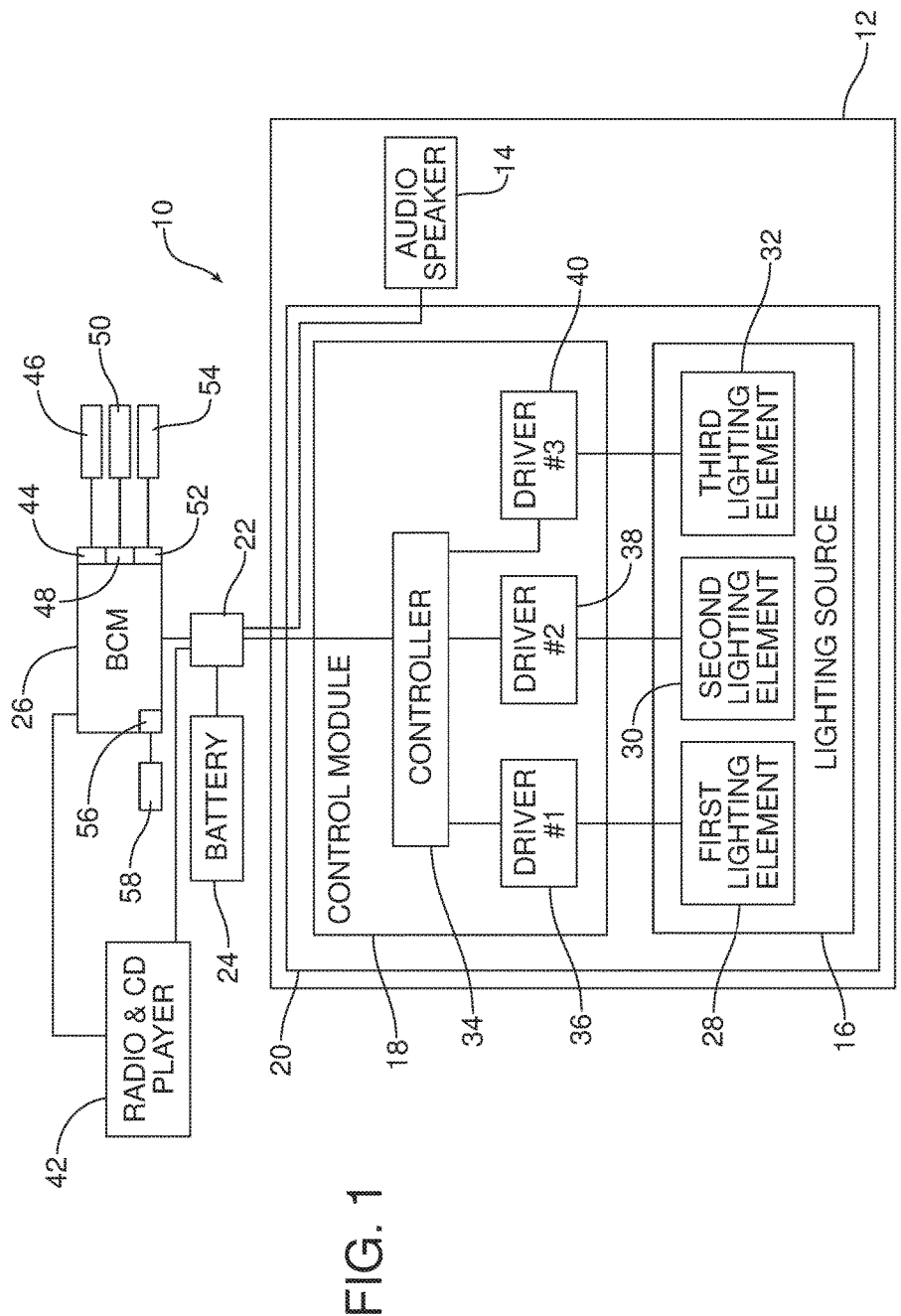
FIG. 1 is a schematic block diagram of the courtesy lighting system.

Reference is now made to FIGS. 1-4 illustrating the courtesy lighting system 10 that is provided for lighting a door 12 of a motor vehicle. As best illustrated in FIGS. 1 and 1a, the courtesy lighting system includes an audio speaker 14, a light source, generally designated by reference numeral 16, and a control module generally designated by reference numeral 18.

In the illustrated embodiment, the audio speaker 14, the light source 16 and the control module 18 are all provided on a single printed circuit board 20 carried on the door 12. That printed circuit board 20 includes a single wiring harness and network interface connection 22 with other systems of the motor vehicle including, for example, a power source, such as a battery 24, a body control module (BCM) 26 and a radio and CD player 42.

More specifically, the lighting source 16 includes a first lighting element 28, a second lighting element 30 and a third lighting element 32. In the illustrated embodiment, the first and second lighting elements 28, 30 function to provide standard ambient lighting of the audio speaker 14 and footwell 60 during motor vehicle operation. The first lighting element 28 also provides a flashing open door warning when the courtesy lighting system 10 is operating in open door warning mode. The second lighting element 30 also provides a higher intensity light to light the footwell 60 when the courtesy lighting system 10 is operating in footwell lighting mode with the door 12 closed. The third lighting element 32 provides for lighting of the ground just outside of the motor vehicle when the courtesy lighting system 10 is operating in puddle illumination mode and the door 12 is opened. These four operating modes will be discussed in greater detail below.

The control module 18 includes a controller 34 which comprises a computing device such as a dedicated microprocessor or electronic control unit (ECU) operating in accordance with instructions provided by appropriate control software. The controller 34 is connected to a first driver 36 for powering the first lighting element 28, a second driver 38 for powering the second lighting element 30 and a third driver 40 for powering the third lighting element 32. Thus, it should be appreciated that the first lighting element 28, the second lighting element 30 and the third lighting element 32 are operated in accordance with commands received from the controller 34.

The body control module or BCM 26 may comprise a computing device such as a dedicated microprocessor or electronic control unit (ECU) operating in accordance with instructions received from appropriate control software. Thus, the BCM 26 may include one or more processors, one or more memories, one or more network interfaces, a human interface, a GPS/geolocator component, a display device such as a multi-function display with touchscreen capability and a speech processor that communicate with each other over a communication bus. As is known in the art, the BCM 26 may perform a number of interior body electrically based functions including, for example, interior door locking, remote key entry, interior lighting, exterior lighting, windshield wiper control and the like. In some embodiments, the BCM 26 may also function to control entertainment functions (e.g. radio, CD player and communications such as telephone and internet communications over a wireless network. In some embodiments, the BCM 26 is connected by a communication bus to other control modules that provide one or more of these additional functions.

In the illustrated embodiment, the BCM 26 includes a first data input 44 connected to a device 46, such as a sensor or other control module capable of providing data with respect to the open/closed status of the door 12. Further, the BCM 26 includes a data input 48 connected to a device 50, such as a sensor or control module capable of providing data with respect to current ambient light conditions. Further, the BCM 26 includes a data input 52 connected to a device 54 such as a sensor or control module, capable of providing data respecting the speed or movement of the wheels of the motor vehicle. In addition, the BCM 26 includes a data input 56 connected to a device 58, such as a sensor or control module, capable of providing data indicating the status of the motor vehicle transmission.

During normal motor vehicle operation, the motor vehicle operator may have configured the BCM 26 to provide standard ambient lighting. If that is the case, the BCM sends a signal to the controller 34 of the courtesy lighting system 10 commanding the controller to provide standard ambient lighting. In turn, the controller 34 sends a command to the first driver 36 to activate the first lighting element 28 and provide for ambient lighting of the audio speaker 14 by means of the light pipe 29 that extends around the audio speaker (See FIG. 1a). The controller 34 may also be configured to send a command to the second driver 38 to activate the second lighting element 30 and provide ambient lighting to the footwell 60. That ambient lighting may be provided at a relatively low intensity so as not in any way distract the driver from the driving of the motor vehicle. Further, that ambient lighting may be provided in a first, selected color such as soft white, yellow, orange, blue or green as desired by the motor vehicle operator.

Figure 2:
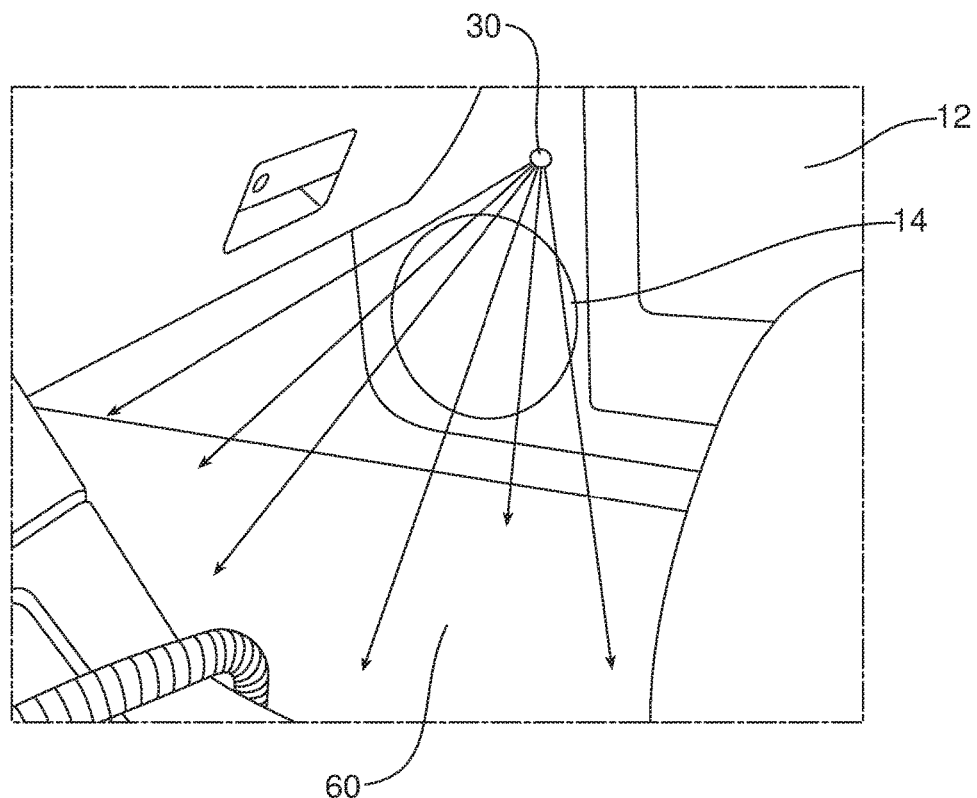
FIG. 2 illustrates the courtesy lighting system operating in footwell illumination mode.
Figure 3:
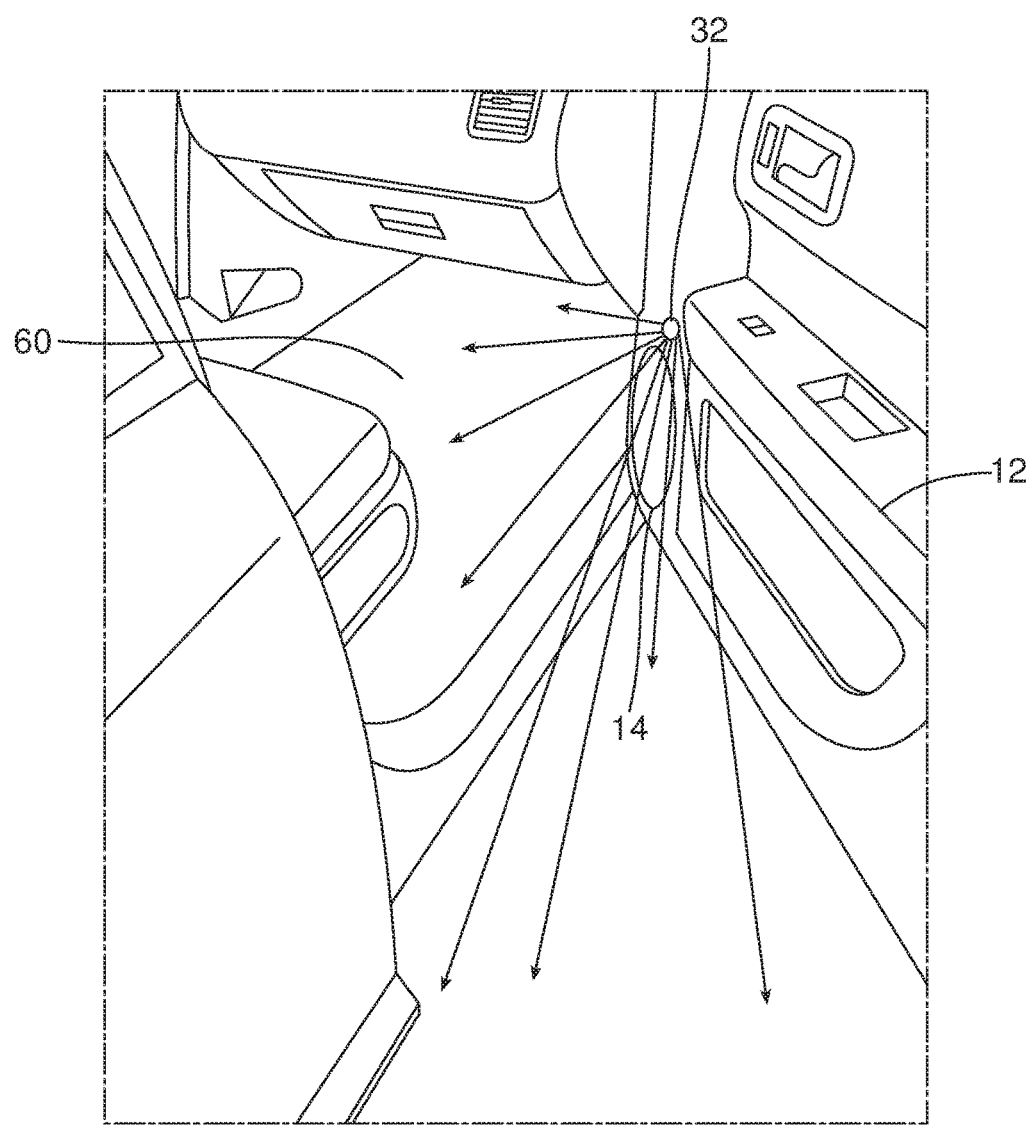
FIG. 3 illustrates the courtesy lighting system operating in puddle illumination mode.
Figure 4:
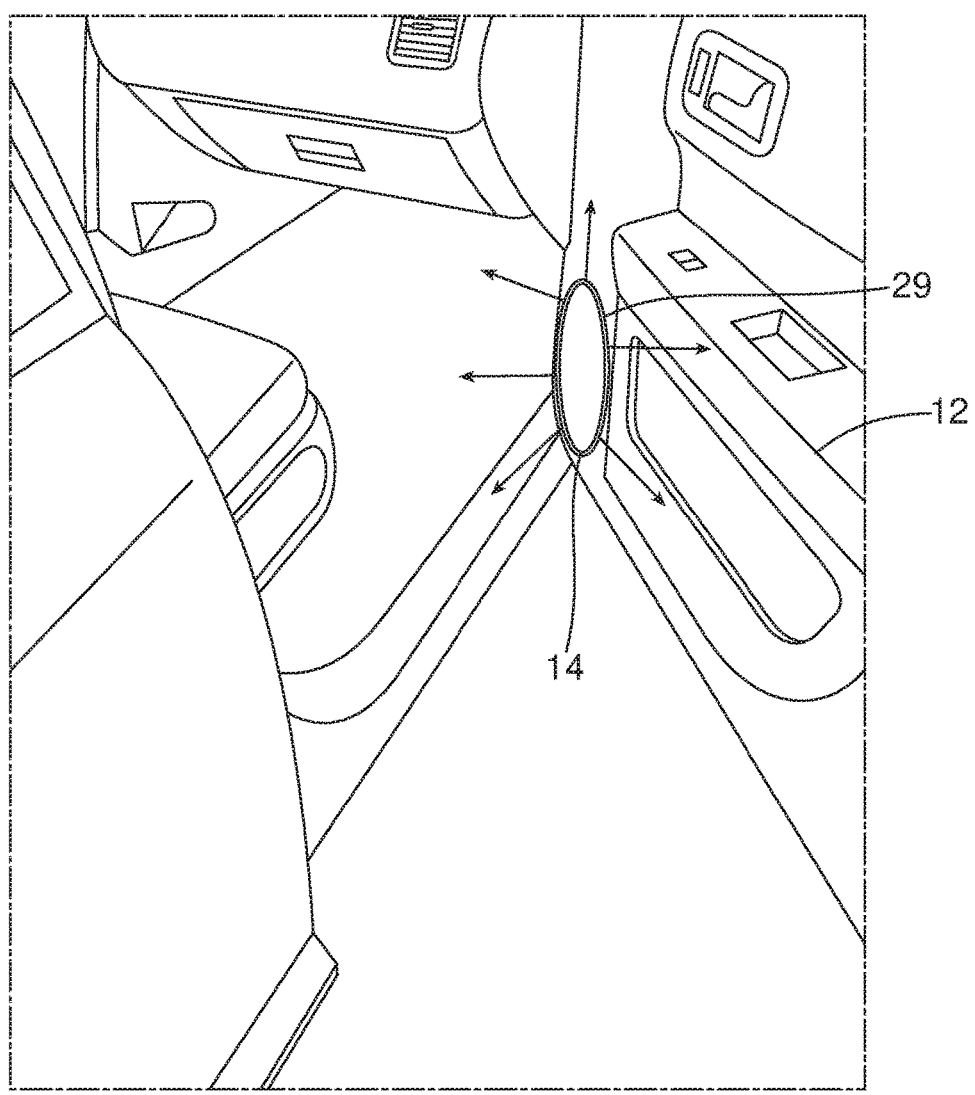
FIG. 4 illustrates the courtesy lighting system operating in open door warning mode.

When the motor vehicle is stopped and the transmission is placed in park as indicated to the BCM 26 at the data input 56 by device 58, the BCM 26 may provide a control signal to the controller 34 directing the controller to initiate footwell illumination mode. In turn, the controller 34 commands: (a) the first driver 36 to deactivate the first lighting element 28 and (b) the second driver 38 to activate the second lighting element 30 to illuminate the footwell 60 as illustrated in FIG. 2. As should be appreciated, the light emitted by the second lighting element 30 may be tailored in intensity, light beam shape and light beam direction as necessary to provide the most effective and efficient lighting of the footwell 60. Typically, in footwell illumination mode the second lighting element 30 is operated at a higher intensity than during ambient lighting mode.

Once the door 12 is opened, the device 46 sends a door open signal to the BCM 26. In response, the BCM 26 sends a command to the controller 34 of the courtesy lighting system 10 to initiate puddle illumination mode. In response, the controller 34 sends a command to the third driver 40 to activate the third lighting element 32. The lighting element 32 provides a light beam of a desired intensity, shape and direction to properly illuminate the ground immediately outside the motor vehicle including particularly the ground located immediately outside the door opening so that one can see where they are stepping when they leave the motor vehicle (See FIG. 3). In this way, puddles, rocks and other undesirable objects such as chewing gum may be avoided.

When one subsequently closes the door 12, a change in door status signal is again sent by the device 46 to the BCM 26. In turn, the BCM 26 sends a command to the controller 34 and the controller 34 sends a deactivation command to the third driver 40 and the third lighting element 32 is extinguished.

When one returns to the motor vehicle and opens the door 12, the door open signal is again sent from the device 46 to the BCM 26 which sends a command to the controller 34 to activate the puddle illumination mode which in turn sends a command to the third driver 40 to activate the third lighting element 32. Once the door 12 is closed, a closed signal is sent from the device 46 to the BCM 26 which in turn sends a command to the controller 34. The controller 34 then sends a signal to the third driver 40 so as to extinguish the third lighting element 32. If not already activated, an additional signal is sent by the controller 34 to the second driver 38 to activate the second lighting element 30 for a predetermined period of time whereby the footwell 60 is lighted in the footwell illumination mode. After a predetermined period of time, the controller 34 sends another signal to the second driver 38 to reduce the intensity of the second lighting element 30. Further, the controller sends a second signal to the first driver 36 to activate the first lighting element 28 and provide ambient light in ambient lighting mode.

If a motor vehicle operator ever begins to drive the motor vehicle while the door 12 is open, the BCM 26 will simultaneously receive a door open signal from the device 46 and a wheel movement signal from the device 54. In response, the BCM 26 will send an appropriate signal to the controller 34 causing the controller to initiate open door warning mode. In this mode, the controller 34 commands the first driver 36 to activate the first lighting element 28 to warn the operator of the open door 12. Toward this end, the first lighting element 28 may be operated in a second, different color than the first color utilized during the ambient lighting mode. In one particularly useful embodiment that color is a red warning color. Further, the first lighting element 28 may be driven by the driver 36 at a higher intensity so as to quickly secure the attention of the motor vehicle operator and warn him that the door 12 is open. The first lighting element 28 may also operate in a flashing mode in order to further draw the attention of the driver. That flashing mode may be constant or may increase in speed and/or intensity over time until the open door condition is corrected and the door is closed.

As noted above, in the illustrated embodiment, the controller 34, the drivers 36, 38, 40 and the lighting elements 28, 30, 32 are all provided on a single printed circuit board 20. Such a printed circuit board 20 has a limited heatsink capacity. In order to conserve this limited heatsink capacity for the first lighting element 28 when operating at a higher intensity in the open door warning mode, the controller 34 may be configured to direct the drivers 38 and 40 to lower the intensity of the second lighting element 30 and third lighting element 32 or even extinguish those lighting elements altogether.

As should be appreciated, the courtesy lighting system 10 illustrated in the drawing figures incorporates an audio speaker 14 and first, second and third lighting elements 28, 30, 32 all carried on a single printed circuit board 20 and operatively connected to other systems of the motor vehicle through a single wiring harness and network interface 22. In effect, three separate circuit boards have been combined into one and three connectors have been eliminated by being integrated into the existing speaker connector. This represents substantial savings in both parts and assembly costs. Advantageously, as best illustrated in FIG. 1b, the door trim panel 58 forms the housing for the printed circuit board 20. Further, the printed circuit board 20 may be heat staked at points 62 to the door trim panel thereby avoiding the costs of fasteners and the assembly costs associated therewith.

As should be appreciated, the courtesy lighting system 10 includes different lighting elements 28, 30, 32 such as light emitting diodes and light pipes to more efficiently and effectively light the footwell 60 in footwell illumination mode and the ground in puddle illumination mode. Further, the ambient lighting element 28 may be utilized in open door warning mode to provide a flashing indication if the door 12 is ajar too long or if the motor vehicle begins to move while the door is open thereby alerting the occupants as to which door is open. Advantageously, the intensity of the first lighting element 28 may be increased in open door warning mode such as to two times the intensity of ambient lighting at night and four times the intensity of ambient lighting during day in order to overcome higher ambient light conditions.

Further, the light source 16, including the lighting elements 28, 30 and 32, may all be built into the speaker grille mesh pattern. In this way, the light source 16 may be conceded from view until activated.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A courtesy lighting system for a door of a motor vehicle, comprising:
   an audio speaker;
   a light source;
   a network interface connected to said audio speaker and said light source; and
   a control module connected to said network interface, said control module including a controller configured to operate in (a) an ambient illumination mode, (b) a footwell illumination mode when said door is closed, (c) a puddle illumination mode when said door is opened and (d) an open door warning mode when said door is opened and said motor vehicle is moving.

2. The courtesy lighting system of claim 1, wherein said light source emits a first light beam in said footwell illumination mode and a second light beam in said puddle illumination mode wherein said first light beam differs from said second light beam by at least one characteristic selected from a group including light intensity, light beam direction and light beam shape.

3. The courtesy lighting system of claim 2, wherein said light source includes a first lighting element for lighting said audio speaker.

4. The courtesy lighting system of claim 3, wherein said light source includes a second lighting element for lighting said footwell when in said footwell illumination mode and said door is closed.

5. The courtesy lighting system of claim 4, wherein said light source includes a third lighting element for lighting ground outside said motor vehicle when in said puddle illumination mode and said door is opened.

6. The courtesy lighting system of claim 5, wherein said audio speaker and said light source, including said first lighting element, said second lighting element and said third lighting element, are provided on a single printed circuit board.

7. The courtesy lighting system of claim 6, wherein said controller is configured to flash said first lighting element when operating in said door open warning mode.

8. The courtesy lighting system of claim 7, wherein said first lighting element operates at a first intensity when providing ambient lighting of said audio speaker and at a second intensity when flashing an open door warning when operating in said open door warning mode wherein said second intensity is greater than said first intensity.

9. The courtesy lighting system of claim 8, wherein said controller is configured to operate said second lighting element and said third lighting element at reduced intensity when operating said first lighting element in said open door warning mode in order to conserve heatsink capacity of said single printed circuit board for said first lighting element.

10. The courtesy lighting system of claim 9, wherein said first lighting element is operated in a first color when providing ambient lighting and in a second, different color when providing an open door warning.

11. The courtesy lighting system of claim 10, wherein said second, different color is red.

12. The courtesy lighting system of claim 11, wherein said controller is configured to compensate for ambient lighting conditions and operate said light source at a higher intensity in higher ambient light conditions and at a lower intensity in lower ambient light conditions.

13. The courtesy lighting system of claim 1, wherein said network interface is a local interconnect network (LIN).

14. A method of lighting a door of a motor vehicle using multiple lighting elements, comprising:
 connecting said multiple lighting elements to a control module by means of a single network interface; and
 configuring a controller of said control module to operate said multiple lighting elements in an ambient illumination mode, a footwell illumination mode, a puddle illumination mode and a door open warning mode when said door is opened and the motor vehicle is moving.

15. The method of claim 14, including commanding, by said controller, a first lighting element to illuminate an audio speaker in a door in a motor vehicle in a first color light when in said ambient illumination mode.

16. The method of claim 15, including commanding, by said controller, said first lighting element to illuminate said audio speaker in a second color light when in said door open warning mode.

17. The method of claim 16, including commanding, by said controller, a second lighting element to light a footwell when in said footwell illuminating mode when said door is closed and a transmission of the motor vehicle is in park.

18. The method of claim 17, including commanding, by said controller, a third lighting element to light ground outside said motor vehicle when in said puddle illuminating mode when said door is opened and the transmission of the motor vehicle is in park.

19. The method of claim 18, including varying, by said controller, lighting characteristics of said first lighting element, said second lighting element and said third lighting element depending upon ambient light conditions.

* * * * *